J. C. LEYDORF.
MEANS FOR PROPELLING VEHICLES.
APPLICATION FILED FEB. 16, 1909.

942,000.

Patented Nov. 30, 1909.

2 SHEETS—SHEET 2.

Witnesses

Inventor
John C. Leydorf.

By Victor J. Evans
Attorney

UNITED STATES PATENT OFFICE.

JOHN C. LEYDORF, OF PERRYSBURG, OHIO.

MEANS FOR PROPELLING VEHICLES.

942,000.  Specification of Letters Patent.  Patented Nov. 30, 1909.

Application filed February 16, 1909. Serial No. 478,259.

*To all whom it may concern:*

Be it known that I, JOHN C. LEYDORF, a citizen of the United States, residing at Perrysburg, in the county of Wood and State of Ohio, have invented new and useful Improvements in Means for Propelling Vehicles, of which the following is a specification.

This invention relates to means for propelling vehicles, the invention being especially designed for manually driving small wagons, invalid carts and the like.

It is also the object of the invention to provide a driving mechanism for the purpose stated which will avoid dead centers and which, taken in connection with an operating lever, will impart continuous rotary motion to the driving shaft of the machine.

A further object of the invention is to provide means whereby the leverage of the driving mechanism may be increased or diminished to suit the will of the operator and enable him to climb hills with greater ease and speed up along level stretches.

With the above and other objects in view, the nature of which more fully appear as the description proceeds, the invention consists in the novel construction, combination and arrangement of parts as herein fully described, illustrated and claimed.

Figure 1:
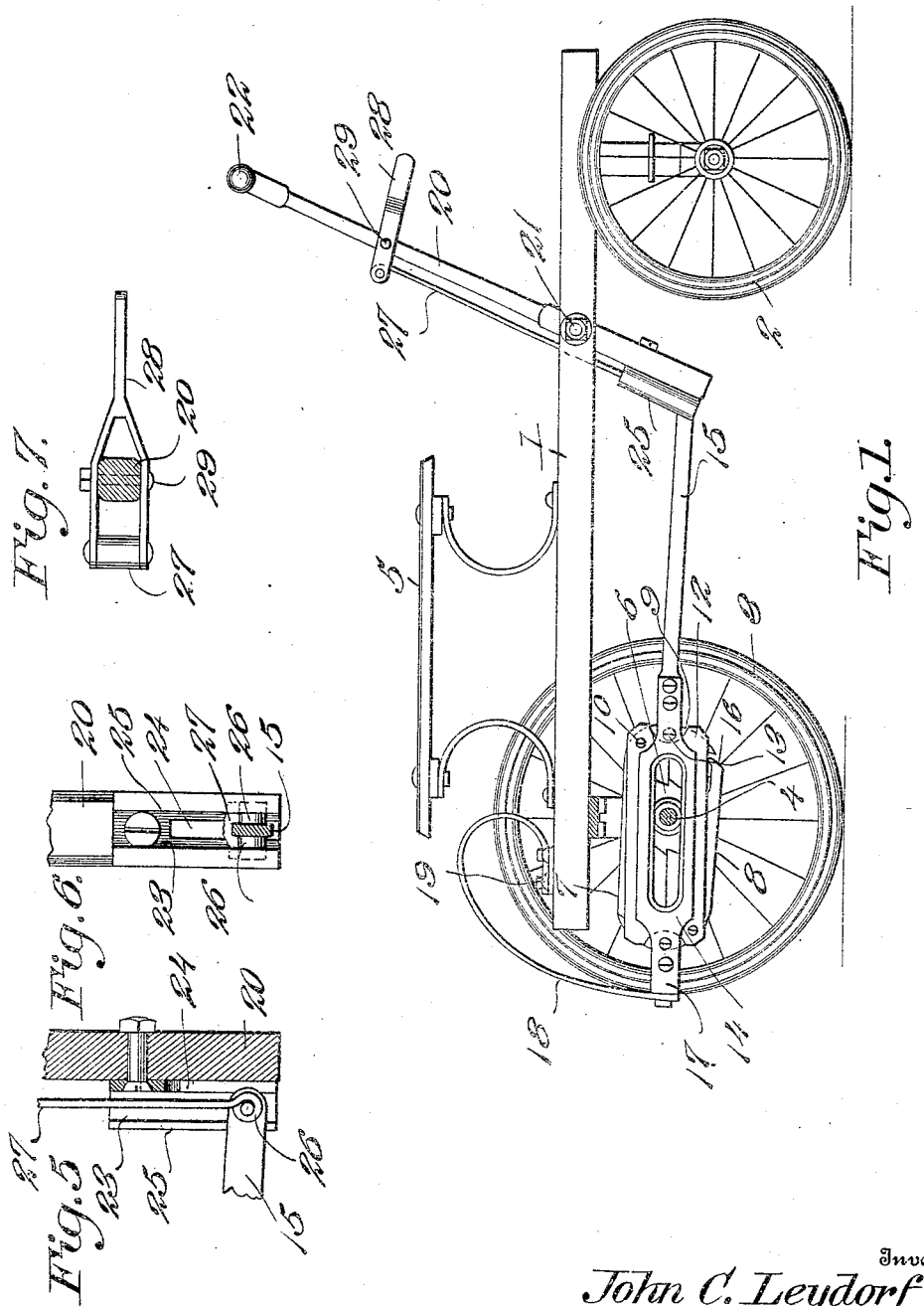
Figure 2:
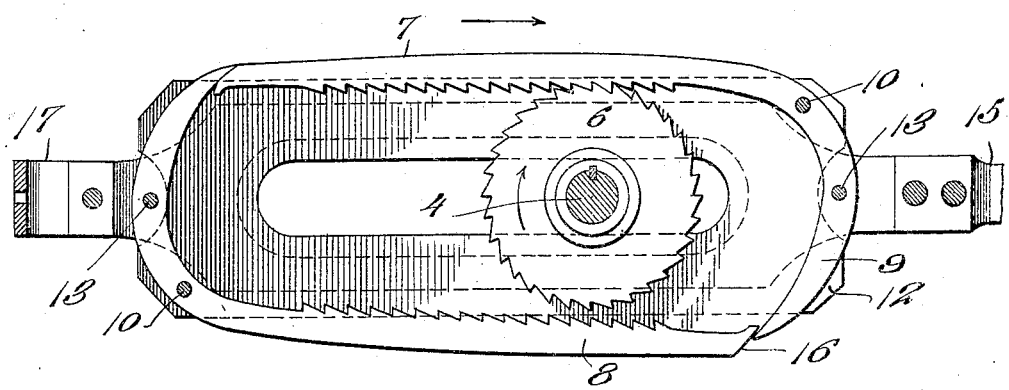
Figure 3:
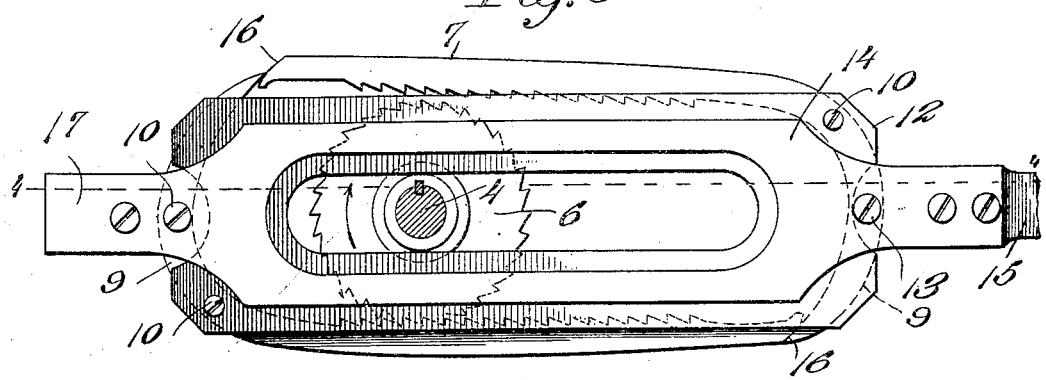
Figure 4:
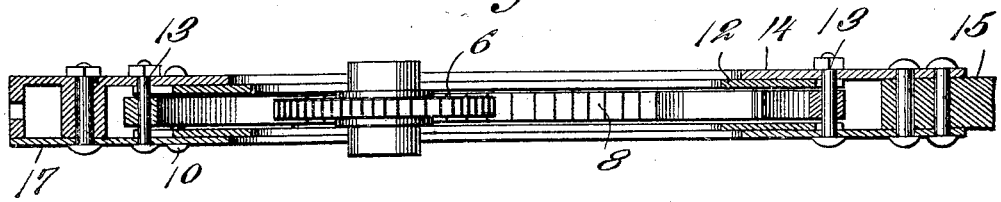

In the accompanying drawings:—Figure 1 is a side elevation of the driving mechanism shown applied to a truck or wagon. Fig. 2 is an enlarged vertical section through the rack and pinion mechanism. Fig. 3 is a side elevation of the same. Fig. 4 is a longitudinal horizontal section through the rack and pinion mechanism. Fig. 5 is a detail section, showing the shiftable pivot or connection between the hand lever and transmission rod. Fig. 6 is a rear elevation of said connection, showing the transmission rod in cross section. Fig. 7 is a section through the hand lever, showing the shipper lever in plan view.

In Fig. 1 of the drawings I have illustrated a small truck or wagon comprising a suitable truck frame 1, front carrying and steering wheels 2 and rear driving wheels 3, the last named wheels being mounted upon the driving axle 4 which is journaled in suitable bearings beneath the truck frame 1.

5 designates the operator's or driver's seat which may be of any suitable construction.

In carrying out the present invention, a drive gear wheel 6 is mounted fast on the driving axle 4 as shown in Figs. 2 and 3, the teeth of said wheel being in ratchet or saw tooth form while meshing with said driving wheel at diametrically opposite points are actuating racks 7 and 8 each of which is the counterpart of the other. Each rack comprises substantially a straight portion as shown in Figs. 2 and 3 to the curved or arcuate portion 9 at one end which is pivotally mounted at 10 between frame or housing plates 12 while at a suitable distance from the pivot 10, the curved portion of the rack is pivotally connected at 13 to a slide 14 which is attached to the rear end of a transmission rod 15. The extremity of the straight portion of the rack 8 is beveled as shown at 16 to ride against the adjacent inner edge of the curved portion of the oppositely located rack member 7 and vice versa, and it will be observed that the teeth of the members 7 and 8 face in opposite directions so that as the slide moves in one direction one of the racks engages the teeth of the gear 6 for driving the axle 4 and when the slide moves in the opposite direction the teeth of the other rack engage said wheel and continue to propel the said wheel in the same direction. In this way, practically continuous rotary motion is imparted to the wheel 6. At the same time when the slide is allowed to remain stationary, the wheel 6 is still free to rotate which permits of coasting on down grades without operating the driving mechanism. It will also be observed that the racks 7 and 8 as well as the teeth of the gear 6 work between the housing plates 12 while the slide 14 comprises oppositely arranged twin sections which lie on opposite sides of the housing plates. The slide is provided with a heel extension 17 to which is connected one end of a flexible support and retractor 18 preferably in the form of a spring the opposite ends of which are secured to the truck frame 1 as shown at 19. The forward end of the transmission rod 15 is adjustably connected to the lower end of a hand lever 20 which is fulcrumed at a point intermediate its length on the truck frame as shown at 21, said lever being provided with a suitable handle grip or handle bar 22 at the upper end thereof. To the lower end portion of the lever 20 there is secured a guide 23 comprising a slotted base 24 and inturned flanges 25 forming grooves or ways for the reception of oppositely projecting trunnions or pintles 26 on the forward end of the transmission rod 15 above referred to. Connected to said end of the transmission rod is an adjusting rod 27 which extends upward alongside of the hand lever 20 and connected pivotally to one end of the shipper lever 28 which is pivotally connected at 29 to the hand lever.

It will be observed that by moving the lever 28 the pintles or trunnions 26 may be slid upward and downward in the guide 23 thereby giving greater or less leverage to the hand lever 21 which will afford greater power for hill climbing and greater speed for level stretches. The lever 28 is preferably bifurcated or forked as shown in Fig. 2 so as to straddle the hand lever 20.

I claim:—

1. Means for propelling vehicles comprising a truck frame, carrying wheels therefor, certain of which constitute the driving wheels, a rotary axle on which the driving wheels are mounted, a toothed wheel fast on said axle, a slide movable transversely of the axle, oppositely arranged pivoted rack members movable with the slide and adapted to alternately engage said toothed wheel, a hand actuated operating lever fulcrumed on the truck frame, a transmission rod connecting the slide with the operating lever, and a flexible support interposed between the truck frame and the slide.

2. Means for propelling vehicles comprising a truck frame, carrying wheels therefor certain of which constitute driving wheels, a driving axle on which the driving wheels are mounted, a toothed wheel fast on said axle, a reciprocatory slide having means for engaging said toothed wheel to impart rotary movement thereto, a hand actuated operating lever fulcrumed on the truck frame, a transmission rod connecting said slide with the operating lever, a pivot at the end of the transmission rod, a guide on the operating lever having a guide-way for said pivot, and means on the operating lever for shifting said pivot toward and away from the fulcrum.

In testimony whereof I affix my signature in presence of two witnesses.

JOHN C. LEYDORF.

Witnesses:
  JOHN CROFT,
  W. F. BROSSIA.